Dec. 2, 1947.   J. H. LITTLE ET AL   2,431,945
THERMAL CONTROL DEVICE FOR STORAGE BATTERIES
Filed Nov. 2, 1943

INVENTORS
JOHN H. LITTLE AND
BY WILLIAM J. RADY
Spencer, Hardman & Fehr
THEIR ATTORNEYS Patented Dec. 2, 1947

2,431,945

UNITED STATES PATENT OFFICE 2,431,945

THERMAL CONTROL DEVICE FOR STORAGE BATTERIES

John H. Little, Huntington Woods, Mich., and William J. Rady, Anderson, Ind., assignors to General Motors Corporation, Detroit, Mich., a corporation of Delaware Application November 2, 1943, Serial No. 508,694

4 Claims. (Cl. 136—182)

This invention relates to battery charging systems and its aim is to protect the battery from excessive decomposition of the water in the electrolyte, particularly when the battery is substantially fully charged and warm. This arm is accomplished by providing means controlled by battery temperature and charging generator voltage for increasing the resistance of the charging circuit to reduce the amount of current flowing to the battery. A resistance element in the charging circuit is normally by-passed by a relay whose magnet coil is controlled by a thermal switch in the battery and by a second relay whose magnet coil is connected with the generator terminals.

A further aim of the present invention is to provide a battery that is especially designed so that it is feasible to assemble the thermal switch from the exterior of the battery and below the normal level of the electrolyte and still not have the switch come in contact with the electrolyte, but also protect it from fumes caused by a too high rate charge, with the result that the corrosive liquid and fumes are excluded from the metal parts of the switch.

Still another aim of the invention is the provision of a special enclosure for the thermal switch, which enclosure has a heat conducting wall immersed in a controlling electrolyte so as to effect a uniform operation of the thermal switch irrespective of the electrolyte level deviation from the normal level. This is accomplished by providing the battery case with a recess adapted to receive a cup-shaped cover with the thermal switch mounted thereon, said cup-shaped cover being fitted with the recess when the cover is inverted and positioned within the recess, said cover forming double thickness walls within the walls of the recess so that the only single thickness wall is the bottom wall of the recess.

Further objects and advantages of the present invention will be apparent from the following description, reference being had to the accompanying drawings wherein a preferred embodiment of the invention is clearly shown.

Figure 2:
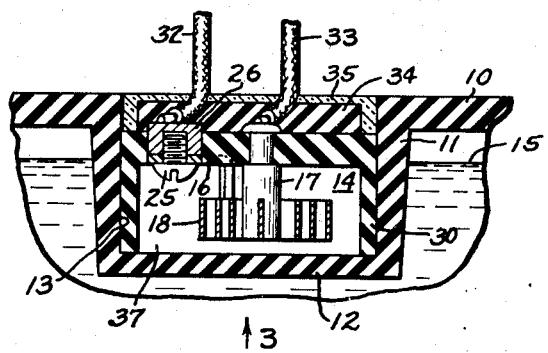
Fig. 2 is a longitudinal sectional view of a thermal switch located in a battery cell cover.
Figure 3:
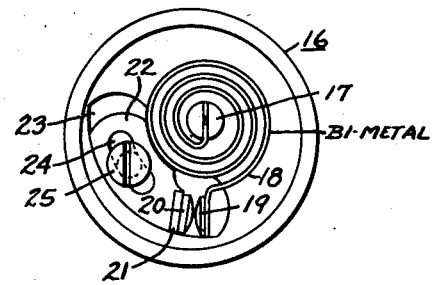
Fig. 3 is a view of the thermal switch looking in the direction of arrow 3 of Fig. 2.

Referring to Figs. 2 and 3, a battery cell cover 10 provides a hollow member 11 depending from the cover. This member comprises a skirt closed by a wall 12 and which constitutes a recess or well 13 for housing a thermal switch 14. The bottom wall which closes the skirt depends a substantial distance below the cover 10 so that it will be immersed in the electrolyte. The normal level of electrolyte in the cell is indicated by the line 15. The thermal switch 14, as shown in the drawing, comprises a cup-shaped case or cap 16 having a stud or post 17 to which one end of a spiral bimetal element 18 is attached. The element 18 carries a contact 19 for engaging a contact 20, mounted on an ear 21 of a bracket 22 adjustable in an arcuate slot 23, concentric with the center of the stud 17. The bracket 22 has an arcuate slot 24 for receiving a screw 25, threaded into an insert 26 in the case 16. The screw 25, when threaded home in the insert 26, holds the bracket in the position necessary to provide a certain initial gap between the contacts 19 and 20. The length of the gap will determine the degree of temperature to which the battery will attain when the contacts close. When this gap is greater, the temperature will be higher and vice versa. The thermal switch is readily affected by changes in battery cell temperature.

The thermal switch, including the cup-shaped case of insulating material, has the same outside diameter as the recess 13 so that the rim will fit snugly with the internal surfaces of the recess performing a substantial hermetic seal therewith.

In the present instance, the case includes an annular rim or flange 30, the ends of which, rest upon the bottom wall 12. In this arrangement, the flange 30 and the skirt 11 form a double thickness wall with the result that fumes which surround the case 10, while in use, are substantially eliminated from the metal parts within the case 16. It will be noted, that the lowermost edges of the spiral bimetal strip 18 are adjacent the bottom wall 12, which is a single thickness wall so as to effect a uniform operation of the thermostatic switch irrespective of the electrolyte level deviation from the normal level indicated by the line 15.

At the time of forming the cap, it is formed with suitable apertures to receive the reduced end of the post 17 and the insert 26 and the recess 23 to receive the bracket 22. The post 17 and insert 26 protrude through the wall as shown in Fig. 2 to make provisions for external connections with insulated conductors 32 and 33 respectively. The external connections are covered with an insulating material 34. The cap is fitted into the recess and is maintained in sealed or fluid tight relation by additional insulating material 35 applied over the top of the material 34. It is to be understood, the material could be a preformed plate with suitable apertures through which the conductors 32 and 33 are threaded.

With a thermostatic switch so constructed as sealed as hereinabove set forth, which is shown in Fig. 2, it will be appreciated that the thermostatic switch is enclosed within a chamber 37 that is completely isolated from electrolyte, fumes and other outside foreign matter which may cause corrosion of the metal elements of the thermostatic switch. Due to the character of the assembly, the thermostatic switch 14, the switch is positioned adjacent the one thickness wall 12 which is normally immersed in the electrolyte so that irrespective of the deviations in the electrolyte level, the operation of thermostatic switch 14 is uniform, in that the heat passing through the wall 12 into the chamber 37 is somewhat localized in raising the temperature within the chamber.

Figure 1:
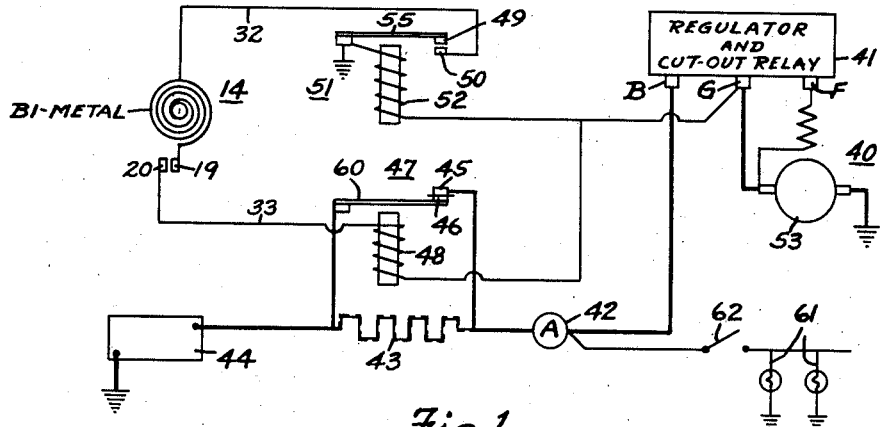
Fig. 1 is a wiring diagram of battery charging system embodying the present invention.

In accordance with the present invention, provision is made for the control of current to the battery by heat generated in the battery. This is illustrated diagrammatically in Fig. 1. As shown, a generator 40, is connected through a voltage regulator and cutout relay unit 41, an ammeter 42 and a resistance 43 with a battery 44, a cell of which carries the thermal switch 14. The contacts 45 and 46 of a relay 47 normally shunt the resistance 43 as indicated by the heavy lines connecting the generator 40 and battery 44. The magnet coil 48 of relay 47 is energized by current from the generator 40 when contacts 19 and 20 of thermal switch 14 are engaged concurrently with the engagement of normally open contacts 49 and 50 of a relay 51 whose magnet coil 52 is connected across the generator armature 53.

When the battery 44 is substantially fully charged, the generator voltage is sufficient to cause an armature 55 of the relay 51 to move down to close contacts 49 and 50. This alone will not cause the magnet coil 48 of relay 47 to be energized. If when the contacts 49 and 50 of relay 51 are closed, the contacts 19 and 20 of thermal switch 14 close due to an elevated battery temperature, so if when the contacts 19 and 20 of switch 14 are closed, the contacts 49 and 50 of relay 51 close due to an elevated generator voltage, the magnet winding 48 of relay 47 is energized to pull the relay armature 60 down to separate contacts 45, 46 thereby interrupting the shunt circuit of resistance 43 and rendering said resistance effective, as indicated by heavy broken lines in Fig. 1, to decrease the flow of current to the battery 44 to protect it from overheating.

The load of lamps 61 or other current consuming devices connected with ammeter 42 by switch 62 is not affected by the reduction in battery charging current.

While the embodiment of the present invention as herein disclosed, constitutes a preferred form, it is to be understood that other forms might be adopted, all coming within the scope of the claims which follow.

What is claimed is as follows:

1. A thermal control device for use in combination with a storage battery case comprising, a thermostatic switch; a battery cover made of molded insulating material and including a thermostat-receiving recess integrally molded therewith to provide a bottom wall of a certain thickness and so positioned and dimensioned as to be at least partially immersed in electrolyte when electrolyte is within the case, said thermostatic switch being positioned within the recess so as to be responsive to temperature changes surrounding the walls of said recess, and means for hermetically sealing said thermostatic switch within said recess and providing side walls which are substantially thicker than the thickness of the bottom wall whereby accurate temperature control of the electrolyte is obtained.

2. A thermal control device for use in combination with a storage battery case comprising a battery cover made of molded insulating material for closing the case and including a receiving recess integrally molded therewith as to be at least partially immersed in electrolyte when electrolyte is within the case; a cup-shaped cap; a thermostatic switch mounted within the cap, said cap having a press fit within the recess when the cap is inverted and positioned therein performing a substantially hermetic seal therewith, said cap forming double thickness walls within the recess so that only a single thickness wall is the bottom wall of the recess whereby accurate temperature control of the electrolyte is obtained.

3. A thermal control device for use with a storage battery case having cells containing electrolyte comprising, a closure for the case made of molding insulating material and including a rigid, close ended tubular shell depending from the closure with the closed end arranged to extend below the normal level of the electrolyte; a cover for the shell; a thermostatic switch supported by the cover, said cover having an annular flange to provide a press fit within the shell and positioning the thermostatic switch within the shell and adjacent the closed end of the shell, said annular flange forming a double side wall above the bottom wall whereby temperature control of the electrolyte is obtained, said thermostatic switch having external cable connections with metallic elements of the switch which protrude through the cover; and sealing means disposed about the external connections and also having sealing engagement with the closure, said sealing means operating to exclude corrosive fumes from the external connections and from the metallic element of the switch within the shell.

4. A thermal control device for use in combination with a storage battery case containing electrolyte comprising, a battery closure for closing the case made of non-corrosive insulating material and including a casing extending downwardly from the closure and having a closed lower end, said casing having a thin wall section adapted to be immersed in the electrolyte; a thermal switch adapted to control a circuit and positioned within the casing and responsive to temperature changes of the electrolyte; a cap to close the casing to form a chamber and including depending portions to fit within the casing to form double thickness side walls except around the thin wall portion so that when the electrolyte is heated the heat will be substantially localized through the thin wall portion as it passes into the chamber and thereby provide a more uniform operation of the switch.

JOHN H. LITTLE.
WILLIAM J. RADY.

REFERENCES CITED

The following references are of record in the file of this patent:

UNITED STATES PATENTS

| Number | Name | Date |
|---|---|---|
| 418,701 | Dey | Jan. 7, 1890 |
| 1,478,084 | Whittington | Dec. 18, 1923 |
| 1,602,559 | Strawmyer | Oct. 12, 1926 |
| 2,377,596 | Williams | June 5, 1945 |
| 2,310,514 | Callender | Feb. 9, 1943 |
| 2,289,128 | Kopf | July 7, 1942 |
| Re. 18,516 | Beetem | July 12, 1932 |
| 1,430,107 | Ogden | Sept. 26, 1922 |
| 1,846,214 | Leingang | Feb. 23, 1932 |
| 1,852,799 | Cheeseman | Apr. 5, 1932 |
| 2,311,574 | Richards | Feb. 16, 1943 |
| 1,314,629 | Andres | Sept. 2, 1919 |
| 976,750 | Schmidt | Nov. 22, 1910 |
| 1,029,344 | Creighton | June 11, 1912 |
| 1,457,863 | Strawmyer et al. | June 5, 1923 |
| 1,597,614 | Nelson | Aug. 24, 1926 |
| 1,779,946 | Nelson | Oct. 28, 1930 |
| 2,069,054 | Adams | Jan. 26, 1937 |